United States Patent
Schreiber et al.

(10) Patent No.: US 6,676,377 B1
(45) Date of Patent: Jan. 13, 2004

(54) DEVICE FOR SIMULTANEOUSLY INTERLOCKING A PLURALITY OF ACTUATORS

(75) Inventors: Thomas Schreiber, Zorneding (DE); Torsten Röhn, Felsberg (DE)

(73) Assignee: ZF Luftfahrttechnik GmbH, Calden (DE)

(*) Notice: Subject to any disclaimer, the term of this patent is extended or adjusted under 35 U.S.C. 154(b) by 206 days.

(21) Appl. No.: 10/018,239
(22) PCT Filed: Jun. 3, 2000
(86) PCT No.: PCT/EP00/05070
§ 371 (c)(1),
(2), (4) Date: Jan. 25, 2002
(87) PCT Pub. No.: WO00/76844
PCT Pub. Date: Dec. 21, 2000

(30) Foreign Application Priority Data

Jun. 10, 1999 (DE) ................................. 199 26 429

(51) Int. Cl.⁷ ................................................ F01D 5/00
(52) U.S. Cl. ................................. 416/143; 416/155
(58) Field of Search ........................ 416/143, 155, 416/156; 244/110 B, 121, 110 D

(56) References Cited

U.S. PATENT DOCUMENTS

| | | | |
|---|---|---|---|
| 4,335,745 A | 6/1982 | Bouveret et al. | 137/554 |
| 4,976,336 A | 12/1990 | Curran | 187/8.5 |
| 5,685,141 A | 11/1997 | Markstein et al. | 60/204 |
| 5,899,226 A | 5/1999 | Devaud et al. | 137/554 |
| 6,045,091 A * | 4/2000 | Baudu et al. | 244/110 B |
| 6,099,254 A | 8/2000 | Blaas et al. | 416/114 |

FOREIGN PATENT DOCUMENTS

| | | | |
|---|---|---|---|
| DE | 196 27 869 A1 | 1/1998 | ......... B64C/27/605 |
| EP | 0 729 883 A1 | 9/1996 | ........... B64C/27/54 |
| EP | 0 801 232 A1 | 10/1997 | ........... F15B/13/04 |
| EP | 0 890 727 A1 | 1/1999 | ............. F02K/1/76 |
| GB | 760646 | 11/1956 | |
| JP | 06270894 | 9/1994 | |

OTHER PUBLICATIONS

Richter, Peter and Hans–Dieter Eisbrecher, "Design and First Tests of Individual Blade Control Actuators", *Proceedings of the European Rotorcraft and Powered Lift Aircraft Forum,* GB, London, Sep. 9, 1990, pp. 1–9.

Götte, Dipl.–Ing. Hans–Jürgen, "Einzelblattsteuerung beim Hubschrauber durch servohydraulische Aktuatoren im Rotorkopf", *Aachener fluidtechnisches Kolloquim, Fachgebiet Hydraulik, Aachen,* Mar. 1994, pp. 1–19.

* cited by examiner

*Primary Examiner*—Edward K. Look
*Assistant Examiner*—James M. McAleenan
(74) *Attorney, Agent, or Firm*—Davis, Bujold, PLLC

(57) ABSTRACT

The invention relates to a device (3) for simultaneously interlocking a plurality of actuators (1) by means of a first locking element (5) which is assigned to each final control element (2) of an actuator (1) and which interacts with a second locking element (6). The second locking element is fixed inside the housing (4) in an actuating direction of the final control element (2) and is displaced into an interlocking position by spring force and into an unlocking position by an assisting force. The invention provides that a plurality of second locking elements (6) are interconnected and are actuated by a common device (11). As a result, the variety of parts, the safety risk, the weight, and the constructional complexity are reduced which is very important especially when the inventive device is used in helicopter.

8 Claims, 3 Drawing Sheets

DEVICE FOR SIMULTANEOUSLY INTERLOCKING A PLURALITY OF ACTUATORS

FIELD OF THE INVENTION

The invention concerns a device for the simultaneous locking of a plurality of actuators.

BACKGROUND OF THE INVENTION

In many cases of control technology, actuators are employed, which, upon dropping out of operation or being switched off from the energy supply, are brought into a safety position and locked in that position. Gotte, H. J., in "Single Blade Control in a Helicopter by means of Servo-hydraulic Actuators in the Rotor Head", 11th Achner Fluid Technology Colloquium, Field of Expertise, "Hydraulics", in Aachen 1994, made known the provision of safety pistons in the case of helicopters with actuators for individual control of rotor blades. These pistons, upon failure of energy for one actuator piston, are run back into a safe position and held there. For this purpose, the safety pistons possess a conically shaped end, which engages itself in a wedge shaped annular groove in the actuator piston. When the actuator is hydraulically activated, the hydraulic pressure acts on the conical end of the safety pistons and slides these safety pistons against the force of a spring into a free float position for the actuator pistons. If the hydraulic pressure totally fails, then the springs slide the safety pistons back into the wedge shaped groove and lock the control pistons in position without play. The said springs can be gas springs.

A separate locking apparatus with an operating mechanism is provided for each actuator. Upon failure of energy supply, all locking apparatuses must be operated at the same time and all actuators must be locked. This is particularly necessary, if the actuators or the locking mechanisms are not hydraulic, but actuated by electricity. Because of the multiplicity of the necessary components, the safety risks are thus increased along with construction expense and the weight.

SUMMARY OF THE INVENTION

The invention has the purpose of creating a device for the simultaneous locking of a plurality of actuators, which is also suitable for application with either electrical or electromagnetic operated actuators, as well as requiring relatively little energy and installation space. This purpose is achieved by the features of claim 1. Further embodiments arise from the subordinate claims.

In accord with the invention are several second locking elements connected to one another. These are operated by a common apparatus. In accord with the number of the locking elements so joined together, just so many operational parts are correspondingly dispensed with, so that the number of the necessary components is strongly reduced. Thereby, the safety risk is minimized, which has great bearing on helicopters operation. Beyond this, the weight and the cost of construction is lessened.

The connection of the second locking elements between one another is formulated very simply, if all locking elements are located in one plane. These planes can be a longitudinal plane or a transverse plane, advantageously, the first locking elements and/or the actuators are located in one plane, so that, by means of transition elements to bridge over, the distances due to different planes are avoided.

Particularly advantageous is the application of the invented device in the case of helicopters. In this case, the safety risk, the weight and the inertia in the rotating system play a significant role. Beyond this, for the individual control of the rotor blades, as a rule several actuators are required in the rotating system. In the case of failure of the supply of energy, the said blades simultaneously must be brought into a safe position and locked, in order that the helicopter can be more safely navigated by mechanical means. Advantageously, the actuators operate by means of a mixing arm as part of the control system of the rotor blades. The mixing arms are installed within the rotor-mast and possess three interconnecting axles, namely, one for the actuator, one for the control rods of the mechanical control and one for a control rod connected to a pitch change horn.

The first locking elements are, in an advantageous manner, in the area of the pivoted axle of the actuator on the mixing arm and are there to connected. If the first locking element is locked by the second element, then the individual control of the rotor blades is blocked from the actuator. Under this condition, only the mechanical control is operative. Now too, the first and second locking elements advantageously are placed in a plane of rotation of the rotor-mast, whereby the second locking element, can be connected with one another by means of a locking ring or a star-shaped element. The second elements, now being connected together, in accordance with one embodiment can be constructed as wedge shaped recesses of the locking ring, into which the first locking elements can engage, upon displacement of the locking ring or the star shaped element. For unlocking, the locking ring or the star shaped element is rotated by an auxiliary force countering the force of a spring into an unlocking position, into which the first locking element, at least within specified limits, is freely movable in the positional direction of the actuator. Upon shutting off, or by the failure of energy, the prestressed spring turns back the locking ring, or the alternate star-shaped element, into the locking position, so that the first locking element is locked in a more safe position. Instead of the rotational movement of the locking ring or the start shaped element, it is also possible, that the locking ring, that is, the connection part of the second locking element carries out an axial movement leading to the locking of the first locking element, if the locking elements are correspondingly constructed or placed for such a function.

Play and positional tolerances can lead to problems by the placement of several actuators on one locking ring. These can, in a reliable manner, be compensated for, in that, either the first of the second locking elements are made resilient in a springing manner and are themselves prestressed. This has the result, that a clamp up is excluded on the part of the locking and in the locked condition, some freedom of play is assured.

In the description and in the claims, many features in this connection are presented and described. The expert will give consideration to the combined features in the concept of the purpose to be achieved and come to advantageous further combinations on his own.

BRIEF DESCRIPTION OF THE DRAWINGS

The invention will now be described, by way of example, with reference to the accompanying drawings in which.

DETAILED DESCRIPTION OF THE INVENTION

Figure 1:
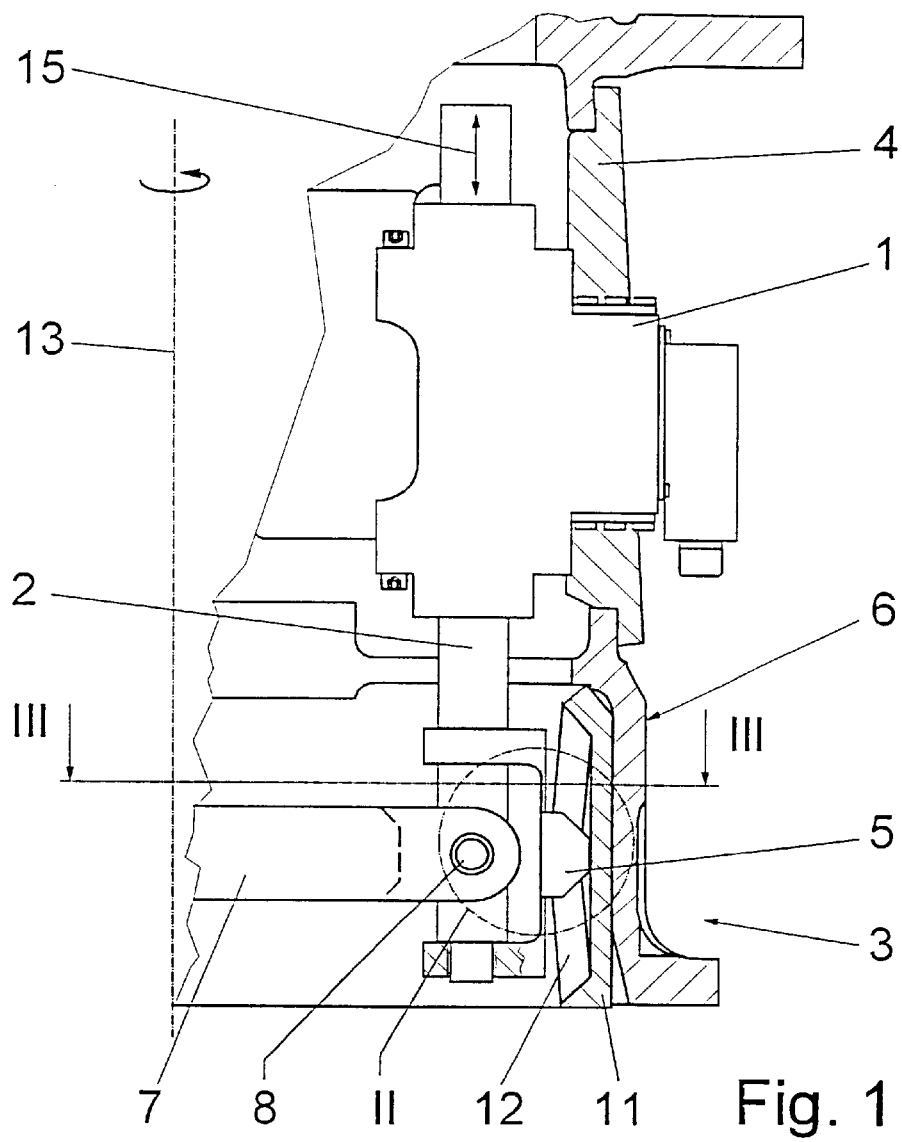
FIG. 1 a schematic partial, longitudinal section through a rotor mast of a helicopter, FIG. 2 a development of a locking ring in the area II of FIG. 1, FIG. 3 a section through the locking mechanism corresponding to the line III—III in FIG. 1.
Figure 2:
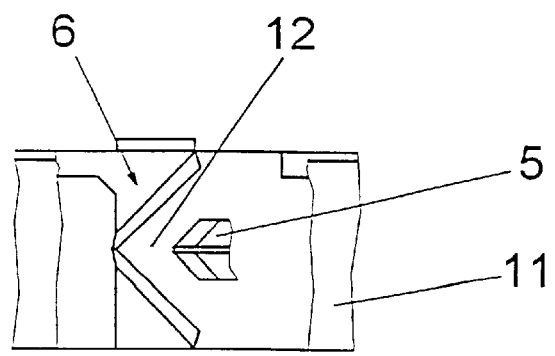
Figure 3:
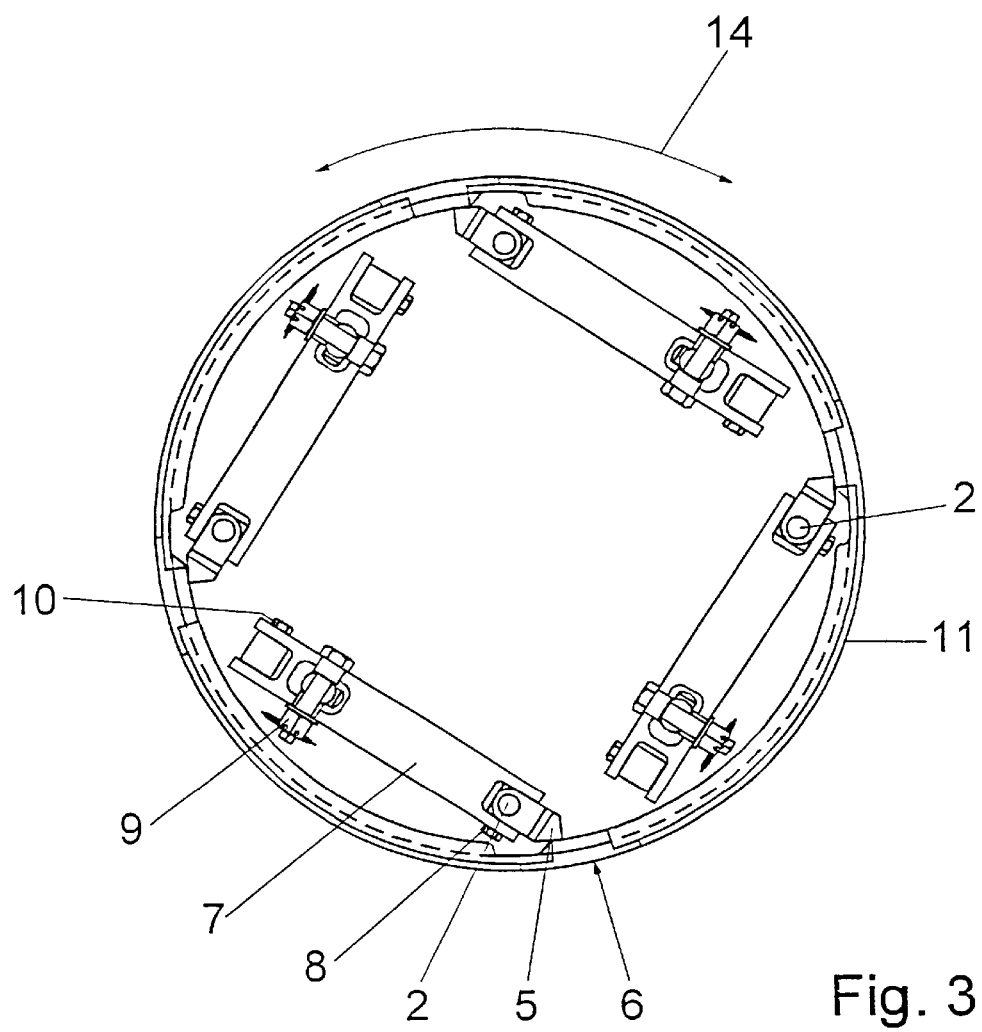

In a rotor mast 4 of a helicopter, which mast is turning about an axis of rotation 13 there are provided in one rotational plane and evenly apportioned about the circumference, four mixing arms 7 with pivot axles 8, 9, and 10. A piston rod 2, acting as a positioner for an actuator 1 is connected with pivot axle 8, while on the pivot axle 10, at the other end of the mixing arm 7, a mechanical control rod for the navigation of the helicopter is pivotally attached. This control rod is not further described. The positioning signal of the actuator 1 and thus that of the said mechanical control rod are transmitted by means of a control rod connected to an assigned rotor blade of the helicopter. This control rod is attached to the pivot axle 9 of the mixing arm 7.

An apparatus 3 for the simultaneous locking of the actuator 1 contains a first locking element 5 and a second locking element 6. In the area of the pivot axle 8, the first locking element 5 is firmly bound to the mixing arm 7. This first locking element 5 engages itself in the second locking element 6, which is affixed in a position direction 15 of the actuator 1 in the rotor mast. The second locking element 6 comprises a wedge shaped recess 12 in a locking ring 11, into which said recess the first locking element 5 engages. Because of the wedge shape, the first locking element 5 is centered and at the end of its movement in the locking direction, the two wedge shaped surfaces mutually fit without play.

Figure 4:
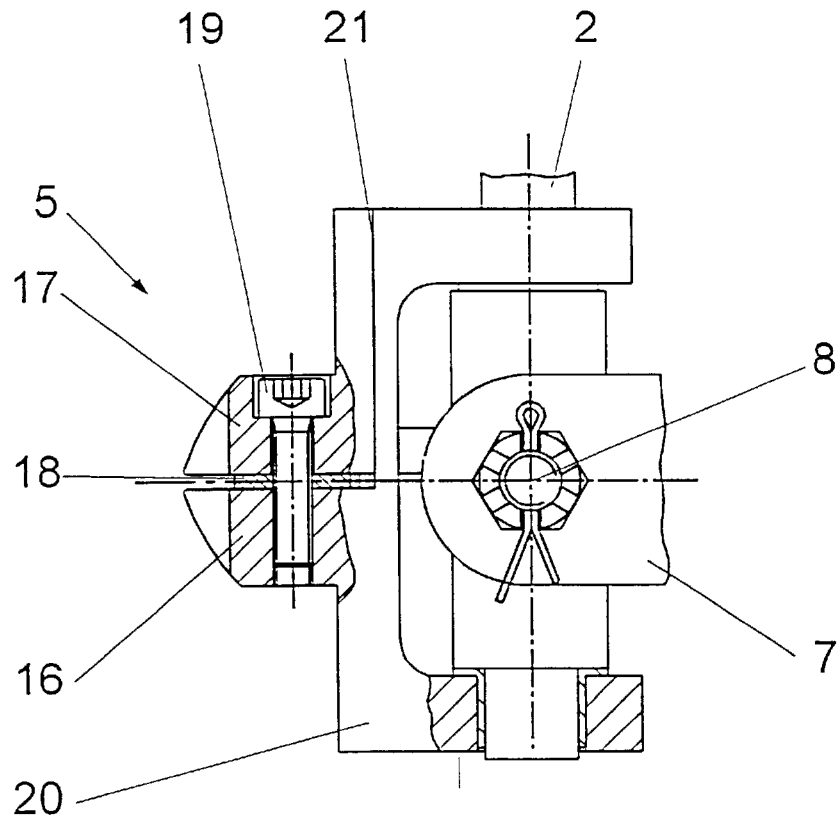
FIG. 4 is a partial section of an embodiment of a locking element on section line 4—4 of FIG. 5.
Figure 5:
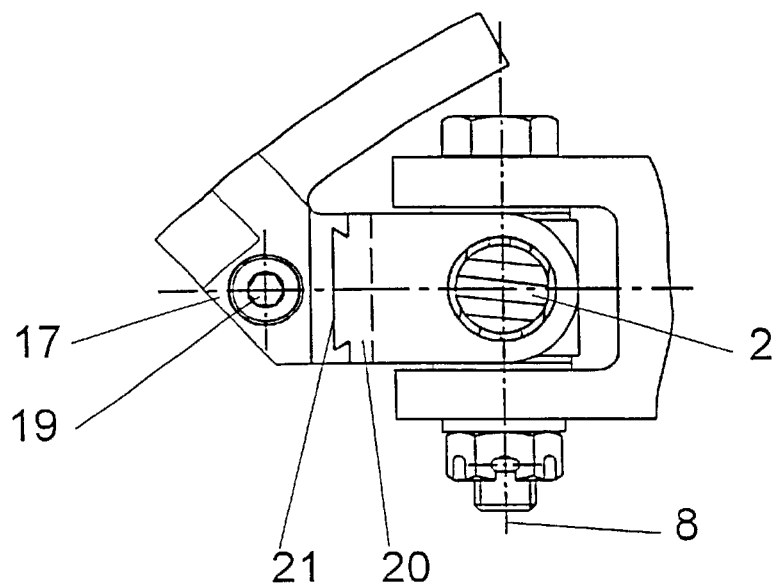
FIG. 5 a plan view of the embodiment of the locking element in FIG. 4.

From the FIGS. 4 and 5, it may be seen, that the first locking element 5 possesses a first wedge element 16 and a second wedge element 17. The first wedge element 16, by means of the jaw 20, is coupled onto the pivot axle 8 relative to the positioning movement direction of the piston rod 2 on the mixing arm 7. The second wedge element 17 can be slidingly displaced along a dove tailed guide 21 opposite to the first wedge element 16.

Between the wedge elements 16 and 17, is placed a plate spring 18, which, by means of the screw 19 has been pre-stressed. If an acting force from pressure on the plate spring 18 exceeds the given pre-stress produced by the screw 19, for instance, upon a locking action, then the slidable second wedge element 17 approaches the stationary first wedge element 16. As a whole, this gives the prestressed wedge element 5 a resiliency when the said prestressed force is overcome.

In the locked condition, the play and position tolerances between the first and second locking elements 5 and 6 are compensated for by the described spring arrangement. By means of this arrangement, even in different engagement positions, a complete locking of all actuators is assured. The same effect can be attained, if, instead of the first wedge element 5, the second element 6 is designed to be springingly resilient.

The locking ring 11 can be rotated through a limited angle 14 of rotation. For the unlocking of the actuator 1, the ring, by means of an auxiliary force opposing the force of a spring, is brought into an unlocking position, in which, the first locking element 5 can freely move itself, at least in a limited distance, in the positioning direction 15 of the actuator 1. If the energy supply is shut off, or fails, then the locking ring 11, by means of the spring force is brought back into the locking position, in which the first locking element 5 lies free on the sides of the wedge shaped recess 12, and thus with the piston rod 2, which is coupled thereto, is blocked in the positioning direction.

Reference Numbers and Items

1 Actuator
2 Piston rod
3 Complete apparatus within motor mast (FIG. 1)
4 Rotor mast
5 First blocking element
6 Second blocking element
7 Mixing arm
8 Pivot axle, connecting 7 to 2
9 Pivot axle, connecting 7 to control rod(s)
10 Pivot axle, pivot for 7, remote from 8
11 Locking ring
12 Recess, V-shape, receives 6
13 Axis of rotation of rotor mast
14 Direction of rotation of 11, limited
15 Axial displacement of piston rod
16 First wedge element
17 Second wedge element
18 Plate spring between 16, 17
19 Screw, stresses 18
20 Jaw, FIG. 4
21 Dove tailed guide block, responds to 18

Claimed is:

1. A device (3) for the simultaneous locking of a plurality of actuators (1) with a first locking element (5) for each positioning control piston rod (2) of an actuator (1), which locking element (5) coacts with a second locking element (6), the second locking element (6) being fixed in the position direction (15) of the piston rod (2) in a housing (4), and the first locking element (5) further, by means of spring force, can be displaced into a locking position and through an auxiliary force into an unlocking position, whereby a plurality of second locking elements (6) are bound to one another and are operated by a common apparatus (11), wherein the actuators (1) are located in a rotating system of a helicopter in which they serve the purpose of individually controlling the rotor blades of said helicopter and the second locking element (6) are formed, by means of one of V-shaped recesses in a locking ring (11) and in a star shaped element, into which the first locking elements (5) engage, upon the displacement of one of the locking ring (11) and of the star shaped element.

2. The device (3) according to claim 1, wherein the actuators (1) operate the control system of the rotor blades by means of a mixing arm (7).

3. The device (3) according to claim 1, wherein the first locking elements (5) in the area of the pivot axle (8) of the actuator (1) on the mixing arm (7) are fast with said mixing arm (7).

4. The device (3) according to claim 3, wherein all locking elements (5, 6) lie in one plane and that this plane of rotation.

5. The device (3) according to claim 1, wherein the unlocking position and the locking position is achieved by the rotation of one of the locking ring (11) and the star shaped element.

6. The device (3) according to claim 1, wherein the unlocking and the locking position is attained by an axial displacement of one of the locking ring (11) and the star shaped element.

7. The device (3) according to claim 1, wherein the first or the second locking elements (5, 6) are designed to be springlike resilient and are of themselves prestressed, in order to compensate for play and positional tolerances of the locking elements upon locking.

8. The device (3) according to claim 7, wherein the first locking element (5) possesses a first coupled wedge element (16) on the mixing arm (7) and a second wedge element (17) which is slidable relative to the first coupled wedge element (16) against the force of a prestressed plate spring (18).

* * * * *